United States Patent
Schiele et al.

(10) Patent No.: US 6,907,973 B2
(45) Date of Patent: Jun. 21, 2005

(54) METHOD AND DEVICE FOR COOLANT OIL FEEDING TO A MULTIPLE-DISC SHIFTING ELEMENT OF AN AUTOMATIC TRANSMISSION

(75) Inventors: Peter Schiele, Kressbronn (DE); Gert Bauknecht, Friedrichshafen (DE); Peter Ziemer, Tettnang (DE); Ulrich Dorr, Constance (DE); Ewald Ast, Friedrichshafen (DE)

(73) Assignee: ZF Freidrichshafen AG (DE)

( * ) Notice: Subject to any disclaimer, the term of this patent is extended or adjusted under 35 U.S.C. 154(b) by 0 days.

(21) Appl. No.: 10/437,526

(22) Filed: May 14, 2003

(65) Prior Publication Data

US 2004/0003977 A1 Jan. 8, 2004

(30) Foreign Application Priority Data

Jul. 5, 2002 (DE) .......................................... 102 30 183

(51) Int. Cl.⁷ ............................................. F16D 13/72
(52) U.S. Cl. ............................... 192/70.12; 192/85 AA; 192/113.36; 188/71.6; 188/264 E
(58) Field of Search ..................... 192/70.12, 113.34, 192/113.35, 113.36, 85 AA; 188/71.6, 264 E (56) References Cited

U.S. PATENT DOCUMENTS

| | | | | |
|---|---|---|---|---|
| 3,105,582 A | * | 10/1963 | Ziabicki ................ | 192/113.35 |
| 3,202,253 A | | 8/1965 | Merritt et al. | |
| 5,305,863 A | | 4/1994 | Gooch et al. | |
| 5,538,121 A | * | 7/1996 | Hering ..................... | 192/70.12 |
| 5,911,292 A | * | 6/1999 | Schade et al. ........... | 192/70.12 |
| 5,913,395 A | * | 6/1999 | Takakura et al. ........ | 192/70.12 |
| 6,029,786 A | * | 2/2000 | Sommer ................... | 192/18 A |
| 6,189,669 B1 | | 2/2001 | Kremer et al. | |
| 6,202,814 B1 | * | 3/2001 | Braford, Jr. ............. | 192/70.12 |

FOREIGN PATENT DOCUMENTS

| | | |
|---|---|---|
| DE | 718 161 | 3/1942 |
| DE | 1 964 041 | 7/1967 |
| DE | 22 22 786 C3 | 11/1973 |
| DE | 28 02 676 A1 | 8/1979 |
| DE | 37 03 098 A1 | 8/1987 |
| EP | 0 143 898 A1 | 6/1985 |
| EP | 0 718 519 A1 | 6/1996 |
| GB | 2 001 713 A | 2/1979 |
| JP | 05321945 | 7/1993 |

OTHER PUBLICATIONS

German Search Report, Apr. 2003.

* cited by examiner

*Primary Examiner*—Richard M. Lorence
(74) *Attorney, Agent, or Firm*—Milde & Hoffberg LLP (57) ABSTRACT

A system and method for supplying cooling fluid for frictional elements, for example multiple disc clutches and multiple disc brakes, in automatic transmissions. The cooling fluid flows through the multiple disc clutch or brake in a predefined manner radially inward or outward, whereby a defined flow through the clutch or brake packet is ensured through a defined pressure difference in the cooling fluid between the cooling fluid supply and the discharge of the cooling fluid. A preferred embodiment of device for supplying the cooling fluid is designed as a ring-shaped channel that partially or fully encloses the clutch or the brake.

51 Claims, 3 Drawing Sheets

Fig. 5

METHOD AND DEVICE FOR COOLANT OIL FEEDING TO A MULTIPLE-DISC SHIFTING ELEMENT OF AN AUTOMATIC TRANSMISSION

FIELD OF THE INVENTION

The present invention relates to a device for supplying cooling fluid for frictional elements, such as multiple disc clutches and multiple disc brakes, in automatic transmissions.

BACKGROUND OF THE INVENTION

According to known designs, automatic transmissions are equipped with rotating multiple wet disc clutches and/or multiple disc brakes with a stationary support by the housing. These switch elements, which may also be used as start-up elements, are arranged or designed such that they do not dip into the oil sump, in order to avoid oil foaming and increased drag torque.

As is known, a clutch is an engageable or switchable element which selectively links two rotating shafts. A brake is an engageable or switchable element which selectively applies a force between a moving (rotating) member and a fixed member. In each case, heat may be produced as the element engages. In typical automotive automatic transmission designs, the clutch or brake is provided as a set of parallel friction plates which engage a nearby surface under influence of a selectively applied hydraulic force.

According to known designs, a separate cooling fluid supply line is provided to cool the switch elements or start-up elements. With rotating clutches, the cooling fluid is most often supplied from the inside, in order to utilize the effect of the centrifugal force for the delivery of the cooling fluid through the pad grooves of the friction pads. With closed multiple disk brakes (both actuated and synchronous), the ability of the centrifugal force to deliver cooling fluid from the inside, through the pad grooves, is no longer available; however, this is not necessary for multiple disc brakes used as switch elements, because the otherwise available cooling is sufficient for dissipating the switching energy.

DE 198 00 490 C2 describes a device for cooling two multiple disc clutches arranged on a gear shaft, with the two multiple disc clutches being arranged radially one above the other, where the supply of the fluid stream is carried out through the gear shaft, and where the fluid stream is diverted to the active clutch by means of deflectors. One disadvantage of this configuration is that a certain arrangement of the clutches is required, which may be disadvantageous, for example due to installation space constraints.

Wet multiple disc brakes are also used as start-up elements, for example as start-up brakes for the reverse gear. To remove the heat that arises due to the friction energy from the start-up brakes, these brakes are completely flooded and the fluid is exchanged. Filling the entire brake causes drag torque that affects other components as well. Furthermore, a defined fluid flow direction, which might ensure that the hot fluid is definitely exchanged and removed after heat absorption, cannot be guaranteed. Therefore, a localized thermal overload of the cooling fluid may occur, potentially resulting in poor operation or premature component failure. Such overload conditions are particularly likely, for example, if the brake is closed before the thermal load of the start-up process is dissipated, or the transmission is operated with a low slippage.

In addition, due to localized heating at a brake or clutch, the friction behavior, that is, the friction coefficient profile, may change in such an adverse manner that friction vibrations are induced in the power train, which constitutes a significant loss in comfort. In case of extreme thermal overload, the fluid filling the transmission may be stressed such that it no longer provides long term protection, and therefore, negatively impacts the cost to the user.

SUMMARY AND OBJECTS OF THE INVENTION

It is an object of an embodiment of the present invention to provide a system and method for supplying cooling fluid for multiple disc clutches and multiple disc brakes in automatic transmissions of motor vehicles that guides the cooling fluid to a multiple disc brake, for example which can also be used as a start-up element, such that defined flow-through, and thus an effective cooling effect, is achieved in both the open and the closed condition.

The present invention provides a system and method for supplying cooling fluid for multiple disc clutches and multiple disc brakes in automatic transmissions of motor vehicles, wherein a defined pressure difference in the cooling fluid between the cooling fluid supply and discharge is maintained to ensure a defined flow through the clutch or brake packet. The cooling fluid flows through the multiple disc clutch or brake in a predefined manner, for example radially inward or outward.

Thus, the present invention proposes that the cooling fluid supply be designed such that the cooling fluid flows through the clutch or the brake in a defined manner, radially from the outside, in the direction toward the center of rotation, or in the opposite direction.

A defined flow through the clutch or brake packet is ensured through controlling pressure difference in the cooling fluid between the feed side and the discharge side of the cooling fluid. This pressure difference is preferably accomplished by a groove design in the friction pads, resulting in defined flow resistances. Thus, the flow of cooling fluid may be inferred from the pressure differential, based on known design parameters. It is noted that, over time, through changes in the flow path configuration or the fluid properties, or both, the flow resistance may change. Therefore, the control may measure, estimate or predict this change, and control the cooling fluid flow accordingly. Likewise, a number of parameters, such as environmental conditions, temperatures of various fluids or components, fluid viscosity, actual or anticipated cooling load, passenger comfort, etc., may be employed, in order to control a desired pressure differential, and therefore estimated flow rate, of cooling fluid.

Thus, according to the present invention, this pressure difference may be configured in a variable manner. For this purpose, a control is provided for controlling the volume flow of the cooling fluid, such that the volume flow, for example at a closed multiple disc brake or clutch, can be distinctly reduced. Thus, aside from the start-up procedures, the flow of the cooling fluid volume is available for switching and lubricating in the transmission, which in turn allows for the use of a smaller dimensioned transmission fluid pump, advantageously improving the efficiency. With the remaining volume flow available for cooling, the closed clutch packet can be efficiently cooled down further.

Thus, a control, for example an electronic control, controls a volume rate of fluid produced by a pump, for example based on a measurement, e.g., from pressure transducers, of a pressure differential of the fluid passing through a clutch or brake of interest. A bypass may shunt cooling fluid to other elements, not subject to this feedback or measurement. Other measurements may also be made to alter a control algorithm.

Within the scope of a first preferred embodiment of a device for supplying cooling fluid, it is proposed that the supply of the cooling fluid be carried out through at least one ring-shaped channel or a cooling fluid supply chamber that partially or fully encloses the brake or the clutch.

With this embodiment, the dynamic pressure that comes into existence at a differential speed in the annular groove can be used as a control signal for controlling the cooling fluid volume. Additionally, based on the invention, the dynamic pressure can also be used as a direct control signal for the clutch valve, should the electronic control fail such that the hydraulic emergency start-up capability is ensured, as required by an emergency or "fail safe" program.

Another preferred embodiment provides that cooling fluid inside the inner disc carrier of the brake or of the clutch, in fact, from the inside to the outside.

It is therefore an object of the invention to provide a method for supplying cooling fluid to a rotating, selectively engageable frictional element of an automatic transmission for a vehicle, comprising the steps of providing a predefined radial flow path for bringing cooling fluid into contact with the frictional element, and defining a pressure difference between a cooling fluid supply and a cooling fluid discharge to ensure a desired flow of cooling fluid through the radial flow path. The cooling fluid flow path may be radially inward or outward. A volume flow of cooling fluid is preferably controlled by varying the defined pressure difference. A dynamic pressure of the cooling fluid may be used as a control signal for a cooling fluid volume control.

In a preferred embodiment, the cooling fluid supply is carried through at least one circumjacent space which at least partially encloses the frictional element.

Under normal conditions, the cooling fluid flow is electronically controlled, while tinder control failure conditions, a preferred embodiment employs a dynamic pressure of the cooling fluid as a direct control signal for an actuation of the frictional element, to provide a hydraulic control mode emergency start-up capability.

In a preferred arrangement the cooling fluid supply is disposed inside an inner disc carrier of the frictional element, and the cooling fluid flows radially from the inside to the outside.

It is a further object of the invention to provide a system for supplying cooling fluid to mutually rotatable frictional elements, such as a clutch or brake, of an automatic transmission for a vehicle, comprising a cooking fluid supply and a cooling fluid discharge, having a respective pressure difference, said pressure difference controlling a flow of cooling fluid about the frictional elements, a maintenance of a defined pressure difference ensuring a defined flow of cooling fluid through the frictional elements. Preferably, the frictional elements comprise friction pads having grooves, the grooves causing a defined flow resistance, such that a defined pressure difference between the cooling fluid supply and the cooling fluid discharge corresponding to the differential speed of the pads can be achieved. The cooling fluid supply may be a circumferential space, which at least partially encloses the frictional elements. Preferably, the cooling fluid discharge leads through a low pressure drop connection to an oil sump.

According to one embodiment, the frictional elements comprises a set of outer discs mounted on a disc carrier and having a tooth structure, wherein the circumferential space comprises first and second annular grooves, the first annular groove comprising a supply channel, cooling fluid within the first annular groove flowing adjacent to the set of outer discs and absorbing heat therefrom, to the second annular groove, which comprises a cooling fluid supply chamber, and radially inward in the direction of the set of outer discs, through the disc tooth structure, and hence into the disc carrier.

According to a different embodiment, a portion of the frictional elements are supported by an inner disc carrier, designed such that the cooling fluid flows radially and in a defined manner from a center of rotation outwards through the frictional elements, with a cooling fluid supply chamber, disposed inside the inner disc carrier, for sourcing cooling fluid and a cooling fluid discharge chamber for receiving cooling fluid. The cooling fluid discharge, for example, includes a space at an outer periphery of the frictional components.

A portion of the pads may be mounted on an outer disc carrier, the outer disc carrier having openings to facilitate a passage of the cooling fluid from the cooling fluid supply to the frictional elements. Likewise, a portion of the pads may be mounted on an inner disc carrier, the inner disc carrier having openings to facilitate a passage of the cooling fluid from the cooling fluid supply to the frictional elements. The cooling fluid flow direction may be, for example, radially inward or outward. At least a portion of the pads may be provided with openings, notches, or grooves, to facilitate the cooling of the pad and passage of the cooling fluid.

The disc carrier may, for example, have a tooth structure. In this case, a play in this structure may provide a path for cooling fluid flow. According to a preferred embodiment, the pads with grooves are placed on an inner disc carrier, such that at a differential speed in the frictional elements is induced in the cooling fluid supply, wherein the magnitude of said dynamic pressure is a function of the square of the differential speed.

According to one embodiment, the cooling fluid supply comprises an annular groove acting as a cooling fluid supply chamber, at least partially enclosing the pads, and wherein the pads comprises a set of outer discs mounted on an apertured disc carrier, further comprising baffles disposed in conjunction with the apertures of the outer disc carrier, to distribute volume flow of cooling fluid to the pads. The coolant fluid discharge may include a ring-shaped channel, which opens into an oil sump, preferably with a low pressure drop therebetween.

A seal or partition may be provided for containing cooling fluid bathing the frictional elements between the cooling fluid supply chamber and the cooling fluid discharge; that is, separate from other components, to allow selective supply of or control over, cooling fluid flow to particular transmission components. Advantageously, a control is provided to selectively control a flow of cooling fluid to those frictional elements which are dissipating heat, for example by being subject to slippage. This allows conservation of cooling fluid by avoiding unnecessary flow to elements which are not subject to slippage, e.g., are fully engaged or disengaged. A preferred type of seal extends between a support of a terminal outer disc to a housing or adjoining hydraulic actuator. The partition may be arranged outside of the frictional elements, sealing against a housing, and at an inside of the frictional elements, sealing by means of a labyrinth seal or an elastomeric seal. A sealing of the cooling fluid supply chamber to the cooling fluid discharge chamber may be provided via a support of the last outer disc to the housing in an unactuated state, and to the adjoining piston, in an actuated state. A sealing of the cooling fluid supply chamber to the cooling fluid discharge chamber may also be provided by elastomeric sealing elements on a hydraulic actuator side and on a support side or in the tooth structure of the terminal discs, respectively.

According to one embodiment, the automatic transmission comprises a hydraulic actuator for engaging the frictional elements, and elastomeric sealing elements are provided as seals on a hydraulic actuator side and on a support side or in the tooth structure of the terminal discs, respectively.

According to a preferable arrangement, the transmission is designed such that no hydrodynamic pressure builds up in the cooling fluid supply during normal operation. Therefore, a relatively simpler control may be employed. Of course, if a hydrodynamic pressure is induced, this may also be accounted for. For example, the transmission may include an actuator piston, having an outer piston diameter (r_KAD) designed in relation to the piston attack diameter (r_KA) such that a compensation of the dynamic pressure acts on the frictional elements. Likewise, an inner piston seal diameter (r_KID) may be dimensioned in relation to a piston attack diameter (r_KA), such that the cooling fluid supply pressure simultaneously acts upon a ring surface that comes into existence between the inner piston seal diameter (r_KID) and the piston attack diameter (r_KA), which at least partially compensates for a dynamic pressure variation, depending on the surface size.

It is a still further object of the invention to provide a system for supplying cooling fluid to mutually rotatable frictional elements of an automatic transmission for a vehicle, comprising a cooling fluid supply and a cooling fluid discharge, having a respective pressure difference, said pressure difference controlling a flow of cooling fluid about the frictional elements, a maintenance of a defined pressure difference ensuring a defined flow of cooling fluid through the frictional elements, wherein the frictional elements comprise pairs of friction surfaces having a mutual rotation about an axis, selectively engageable by application of an axial force to selectively transmit a rotational force therebetween, a relative slip between adjacent discs generating heat, wherein the cooling fluid is present proximate to heat-generating surfaces of the frictional elements and has a general flow pattern in a radial direction.

A control may be provided for selectively controlling a pressure difference between the cooling fluid supply and the cooling fluid discharge, to thereby control a volume flow of cooling fluid. A dynamic pressure of the cooling fluid resulting from rotation within the transmission may provide a control signal for a fail-safe operating mode to selectively engage the frictional elements to transmit a rotational force therebetween. For example, an electronic control may be provided for controlling the cooling fluid flow, wherein, in case the electronic control fails, an emergency control employs a dynamic pressure of the cooling fluid as a direct control signal for an actuation of the frictional elements to control a mutual rotation thereof, such that a hydraulic control mode emergency start-up capability is ensured within the scope of an emergency program.

Another object of the invention is to provide a system for cooling a clutch or brake in an automatic transmission for a vehicle with a fluid, the clutch or brake selectively transmitting a rotational force based on an axially applied pressure between respective pairs of discs, the discs generating heat as a result of slippage, comprising a cooling fluid supply and a cooling fluid discharge, the cooling fluid supply being concentric with the discs, a radial flow path for cooling fluid being defined, allowing, intimate contact of fluid with portions of radial surfaces of the discs, wherein a flow rate of cooling fluid is controlled by a respective pressure difference between the cooling fluid supply and the cooling fluid discharge. An electronic control may selectively activate a hydraulic piston, to apply the axially applied pressure, wherein a backup hydraulic mode control is provided, in an event of electronic control failure, based on a dynamic pressure of cooling fluid resulting from rotation of transmission components, to hydraulically activate the hydraulic piston. The pairs of discs may be present in the form a clutch packet, wherein a rotation of the discs induces a dynamic pressure of the cooling fluid, and a piston is provided for actuating the clutch packet by applying a pressure along a rotational axis, the piston having an outer piston diameter and a piston attack diameter, the outer piston diameter being designed in relation to the piston attack diameter to compensate for the effect of the dynamic pressure on the flow of cooling fluid through the clutch packet.

According to a preferred embodiment the transmission includes a plurality of separately operable clutches or brakes, further comprising a control for selectively controlling a pressure differential between the cooling fluid supply and the cooling fluid discharge for each clutch or brake. The control may dynamically provide a high pressure differential for clutches or brakes subject to slippage, and a low pressure differential for clutches or brakes not subject to slippage, thus selectively cooling those structures anticipated to dissipate heat.

The pairs of discs of the clutch or brake may be mounted on inner disc carriers and outer disc carriers, respectively, the inner and outer disc carriers having apertures permitting cooling fluid flow in a radial direction, further comprising at least one elastomeric seal for selectively containing the cooling fluid proximate to the pairs of discs and separate from other transmission components.

These and other objects and features of the present invention will become more fully apparent from the following description and appended claims taken in conjunction with the accompanying drawings, in which like numerals refer to like parts.

BRIEF DESCRIPTION OF THE DRAWINGS

Following, the invention will be explained in greater detail based on the enclosed figures, of which

DETAILED DESCRIPTION OF THE PREFERRED EMBODIMENTS

Figure 1:
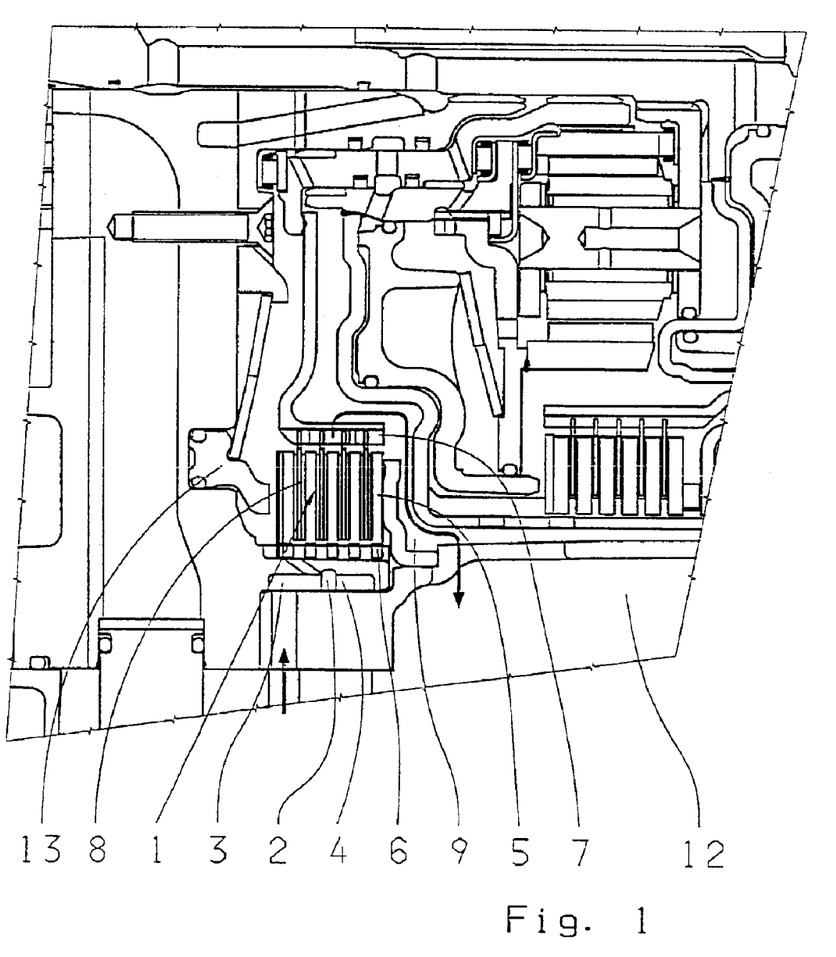
FIG. 1 shows a sectional view of a part of an automatic transmission with a device for supplying cooling fluid according to a first embodiment of the present invention.

FIG. 1 shows, within the scope of a sectional view of an automatic transmission, a brake 1 that is cooled by a device for supplying cooling fluid according to a first embodiment of the present invention.

The device for supplying the cooling fluid comprises a dual annular groove 2 in order to implement the fluid transfer. In the first annular groove 3, which is designed as a supply channel, the cooling fluid is advanced upwards in the direction of the brake 1 (in the direction of the arrow 20), in order to arrive at the crossover to the cooling fluid supply chamber 4, which is presented as an annular groove. Heat absorption is already commenced while the cooling fluid is transported in the first annular groove 3, and is induced into the disc carrier 6 through the outer discs 5 through the disc tooth structure. In addition, the annular groove 3 avoids a complicated channel path for the supply of the cooling fluid volume flow.

According to one preferred variation of this embodiment, the first annular groove 3 can be emitted; in this case, the cooling fluid is directed directly into the second annular groove 4, whereby the volume flow of the cooling fluid can be distributed at the circumference through respective baffles at the passage openings from the outer disc carrier 6 to the clutch packet.

The passage of the cooling fluid from the cooling fluid supply chamber 4 to the clutch packet occurs through openings in the outer disc carrier, through pad grooves or alternatively through openings in the outer discs 5.

According to the present invention, the heated cooling fluid is guided from the clutch packet through openings in the inner disc carrier 7 or through the play in the tooth structure of the inner discs 8 in the direction of the arrow 21, to the cooling fluid discharge chamber 9, which exhibits a low pressure drop connection to the oil sump 12.

This arrangement provides a sealing of the cooling fluid supply chamber 4 to the cooling fluid discharge chamber 9, through the support of the last outer disc, and in the actuated case, to the adjoining piston 13. An alternative embodiment provides elastomeric sealing elements for sealing on the piston side and the support side, which may also be built into the tooth structure of the outer discs 5.

In the embodiment according to FIG. 1, pad discs with pad grooves are provided and placed on the inner disc carrier 7. Through this designs a dynamic pressure is induced into the cooling fluid supply chamber 4 at a differential speed in the brake; the magnitude of the pressure is a function of the square of the differential speed.

This pressure information is used for controlling the cooling oil volume flow; and it can also be used to provide fail safe functions for emergency program circuits. Through the dynamic pressure, which is provided as a control signal to a control or clutch valve that controls the clutch pressure in the respective brake or clutch, a pure hydraulic emergency start-up mode can move the vehicle from a dangerous spot (e.g., a train crossing or freeway) without the need for considerable additional expenditures (e.g., pitot tube, additional valves, centrifugal governor, etc.).

In another embodiment of the invention, the outer discs 5 can be designed as pad discs with no hydrodynamic pressure build-up in the cooling fluid supply chamber 4. In this manner, the cooling fluid can pass through the discs with an advantageous low pressure even at a high differential speed. This embodiment is the subject of FIG. 3.

Figure 3:
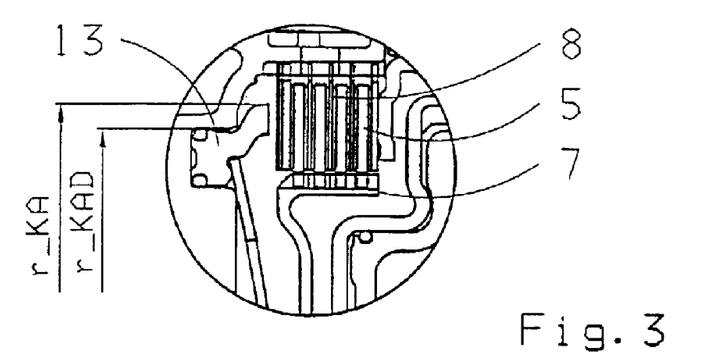
FIG. 3 shows a detail view of the outer discs and the outer seal ring of the piston of a brake according to the present invention with the supply of the cooling fluid from the outside to the inside.

According to the invention, the outer piston seal diameter r_KAD, i.e., the outer sealing ring of the piston 13, is designed in relation to the piston attack diameter r_KA, i.e., to the contact diameter at the clutch packet, such that at the rotating pad discs, a compensation of the dynamic pressure acts upon the clutch packet, because at a differential speed the dynamic pressure acts through the pad groove surface against the piston force, and thus negatively influences the brake in its torque transfer capability. This may be a partial, full or overcompensation. An advantageous design of the outer piston seal diameter and of the contact diameter of the piston 13 is shown in FIG. 3.

Figure 2:
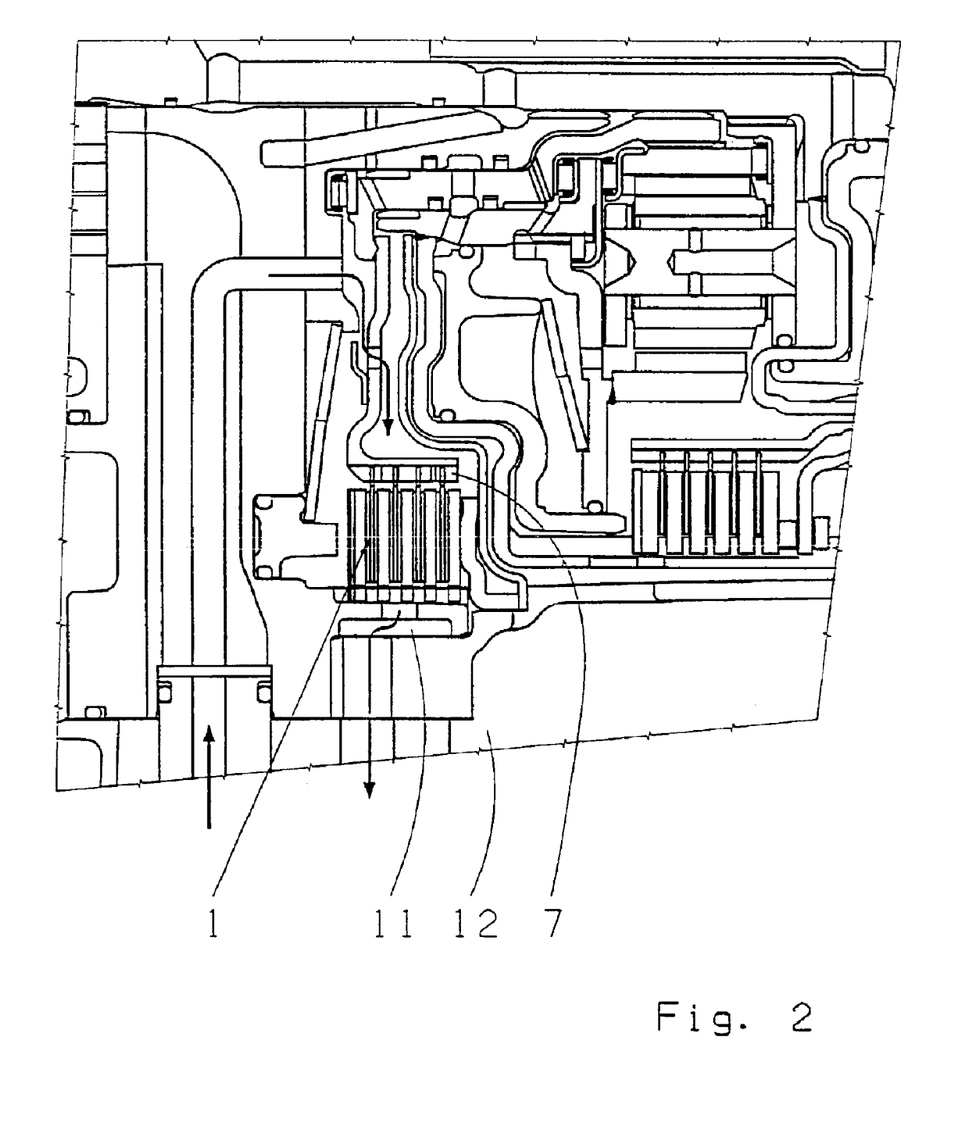
FIG. 2 shows a sectional view of a part of an automatic transmission with a device for supplying cooling fluid according to a second embodiment of the present invention.

FIG. 2 shows a sectional view of an automatic transmission with a brake 1 that is cooled using a device for supplying cooling fluid according to a second embodiment, whereby the cooling fluid passes in a defined manner through the clutch, or the brake, radially from the center of rotation to the outside according to the arrows 22, 23. In this case, the cooling fluid supply occurs inside the inner disc carrier 7 of the brake 1, or the rotating clutch, respectively.

Figure 4:
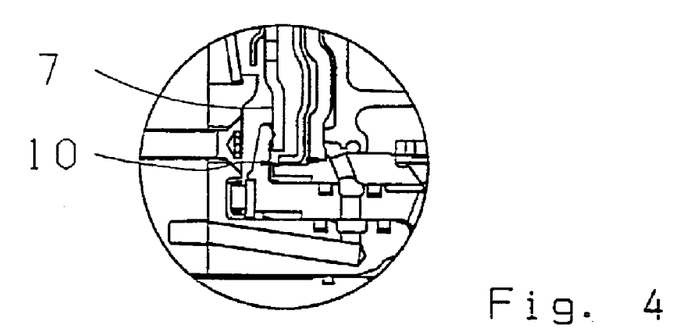
FIG. 4 shows a detail view of a seal for the clutch or brake chamber according to the present invention with the supply of the cooling fluid from the inside to the outside.

According to the invention, a partition is provided to seal the clutch or brake chamber in order to avoid an uncontrolled cooling fluid discharge towards other components, which could then lead to drag torque and fluid foaming. This partition may be arranged outside on the housing in a sealing manner and at the inner diameter through a labyrinth seal 10 or a slipping elastomeric seal, as shown in FIG. 4 in an exemplary manner.

The cooling fluid passes through openings in the inner disc carrier 7, or alternatively through the play in the tooth structure of the inner discs 8. Discharge of the heated cooling fluid is carried out through openings in the outer disc carrier 7 or alternatively through the play in the tooth structure of the outer discs, into a ring-shaped channel 11, with an opening into the oil sump 12 when braking. By means of a rotating clutch, the heated cooling fluid is extracted at the transmission housing or at other components, resulting in a return flow to the oil sump 12.

In this case, as has already been explained, sealing of the cooling fluid supply chamber 4 to the cooling fluid discharge chamber is provided through the support of the last outer disc to the housing, or for the actuated case, to the adjoining piston 13. Alternatively, elastomeric sealing elements may be used on the piston side and the support side, or may be built into the tooth structure of the outer discs.

Figure 5:
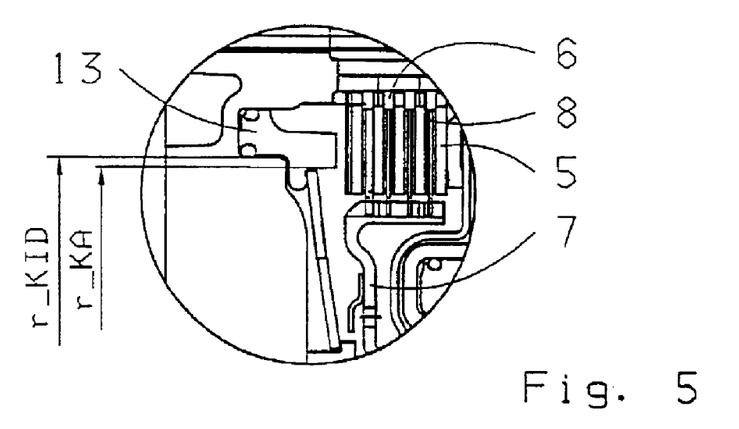
FIG. 5 shows a detail view of a design of the piston of a clutch or brake according to the present invention with the supply of the cooling fluid from the inside to the outside.

According to the invention, the inner piston seal diameter r_KID, i.e., the inner sealing ring of the piston 13, is dimensioned or designed in relation to the piston attack diameter r_KA, such that the cooling fluid supply pressure (pressure in the cooling fluid supply chamber), which through the piston acts against the clutch actuation force via the pad groove surface, due to the occurring pressure drop, at the same time acts upon the ring surface that comes into existence between the inner piston seal diameter (r_KID) and the piston attack diameter (r_KA), and in this manner acts to either partially or fully compensate, depending on the surface size. An advantageous design of the piston is shown in FIG. 5.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. A method for supplying cooling fluid to a rotating, selectively engageable frictional element of an automatic transmission for a vehicle, comprising:

providing a predefined radial flow path for bringing cooling fluid into contact with the frictional element; and defining a pressure difference between a cooling fluid supply and a cooling fluid discharge to ensure a desired volume flow of cooling fluid through the radial flow path, wherein said volume of flow of cooling fluid is controlled by varying said defined pressure difference, said volume flow of cooling fluid causing a dynamic pressure of the cooling fluid, and wherein said dynamic pressure of the cooling fluid is used as a control signal for a cooling fluid control.

2. The method according to claim 1, wherein the cooling fluid supply is carried through at least one circumjacent space which at least partially encloses the frictional element.

3. The method according to claim 1, wherein the cooling fluid supply is disposed inside an inner disc carrier of the frictional element, and the cooling fluid flows radially from the inside to the outside.

4. The method according to claim 1, wherein the frictional element comprises a plurality of discs forming a clutch.

5. The method according to claim 1, wherein the frictional element comprises a plurality of discs forming a brake.

6. The method according to claim 1, wherein the predefined radial flow path is radially outward.

7. The method according to claim 1, wherein the predefined radial flow path is radially inward.

8. A method for supplying cooling fluid to a rotating, selectively engageable frictional element of an automatic transmission for a vehicle, comprising:

providing a predefined radial flow path for bringing cooling fluid into contact with the frictional element;

defining a pressure difference between a cooling fluid supply and a cooling fluid discharge to ensure a desired volume flow of cooling fluid through the radial flow path;

under normal conditions, electronically controlling the cooling fluid flow, and under control failure conditions, employing a dynamic pressure of the cooling fluid as a direct control signal for an actuation of the frictional element, to provide a hydraulic control mode emergency start-up capability.

9. The method according to claim 8, wherein a volume flow of cooling fluid is controlled by varying the defined pressure difference.

10. The method according to claim 8, wherein a dynamic pressure of the cooling fluid caused by the cooling fluid flow is used as a control signal for a cooling fluid volume control.

11. A system for supplying cooling fluid to mutually rotatable frictional elements of an automatic transmission for a vehicle, comprising a cooling fluid supply and a cooling fluid discharge, having a respective pressure difference, including a dynamic pressure caused by a volume flow of cooling fluid, said pressure difference controlling a volume flow of cooling fluid through the frictional elements, said dynamic pressure being a control signal for controlling said volume flow of cooling fluid, a maintenance of a defined pressure difference ensuring a defined volume flow of cooling fluid through the frictional elements.

12. The system according to claim 11, wherein the frictional elements comprise friction pads having grooves, said grooves causing a defined flow resistance, such that a defined pressure difference between the cooling fluid supply and the cooling fluid discharge corresponding to the differential speed of the pads can be achieved.

13. The system according to claim 12, wherein at least a portion of the pads are mounted on an outer disc carrier, the outer disc carrier having openings to facilitate a passage of the cooling fluid from the cooling fluid supply to the frictional elements.

14. The system according to claim 12, wherein at least a portion of the pads are provided with openings to facilitate the passage of the cooling fluid from the cooling fluid supply to the frictional elements.

15. The system according to claim 12, wherein the cooling fluid supply comprises an annular groove acting as a cooling fluid supply chamber, at least partially enclosing the pads, and wherein the pads comprises a set of outer discs mounted on an apertured disc carrier, further comprising baffles disposed in conjunction with the apertures of the outer disc carrier, to distribute volume flow of cooling fluid to the pads.

16. The system according to claim 12, wherein the pads are mounted on respective inner and outer disc carriers, wherein apertures are provided in the inner disc carrier to permit radial flow of heated cooling fluid between the friction disc pads and the cooling fluid discharge.

17. The system according to claim 16, wherein the cooling fluid discharge leads through a connection to an oil sump, the connection exhibits has a low pressure drop.

18. The system according to claim 12, wherein a portion of the pads are mounted on an inner disc, the inner disc baying a tooth structure, a flow of heated cooling fluid occurring through a play of the tooth structure.

19. The system according to claim 12, wherein the pads with grooves are placed on an inner disc carrier, such that at a differential speed in the frictional elements is induced in the cooling fluid supply, wherein the magnitude of said dynamic pressure is a function of the square of the differential speed.

20. The system according to claim 12, wherein the frictional elements comprise pads on outer discs, having a configuration such that no hydrodynamic pressure builds up in the cooling fluid supply.

21. The system according to claim 12, further comprising an actuator piston, having an outer piston diameter (r_KAD) designed in relation to the piston attack diameter (r_KA) such that a compensation of the dynamic pressure acts on the frictional elements.

22. The system according to claim 11, wherein the cooling fluid supply comprises a circumferential space, which at least partially encloses the frictional elements.

23. The system according to claim 11, wherein a portion of the frictional elements are supported by an inner disc carrier, designed such that the cooling fluid flows radially and in a defined manner from a center of rotation outwards through the frictional elements, further comprising a cooling fluid supply chamber, disposed inside the inner disc carrier, for sourcing cooling fluid and a cooling fluid discharge chamber for receiving cooling fluid.

24. The system according to claim 23, further comprising a partition for sealing a chamber including the frictional elements in order to avoid an uncontrolled fluid discharge towards other transmission components.

25. The system according to claim 24, wherein the partition is arranged outside of the frictional elements, sealing against a housing, and at an inside of the frictional elements, sealing by means of a labyrinth seal or an elastomeric seal.

26. The system according to claim 23, wherein the inner disc carrier has apertures to facilitate passage of the cooling fluid.

27. The system according to claim 23, wherein the inner disc carrier has a play of the tooth structure, or the frictional elements supported by the inner disc carrier have notches, to facilitate passage of the cooling fluid.

28. The system according to claim 23, further comprising an outer disc carrier for supporting a portion of the frictional elements, having openings provided to facilitate discharge of the heated cooling fluid.

29. The system according to claim 23, wherein the outer disc carrier has a tooth structure, dimensioned such that the discharge of the heated cooling fluid occurs via a play of the tooth structure.

30. The system according to claim 23, wherein a ring-shaped channel is provided which opens into an oil sump, communicating with the cooling fluid discharge.

31. The system according to claim 23, wherein a sealing of the cooling fluid supply chamber to the cooling fluid discharge chamber is provided via a support of the last outer disc to the housing in an unactuated state, and to the adjoining piston, in an actuated state.

32. The system according to claim 23, wherein a sealing of the cooling fluid supply chamber to the cooling fluid discharge chamber is provided by elastomeric sealing elements on a hydraulic actuator side and on a support side or in the tooth structure of the terminal discs, respectively.

33. The system according to claim 23, wherein an inner piston seal diameter ($r\_KID$) is dimensioned in relation to a piston attack diameter ($r\_KA$), such that the cooling fluid supply pressure simultaneously acts upon a ring surface that comes into existence between the inner piston seal diameter ($r\_KID$) and the piston attack diameter ($r\_KA$), which at least partially compensates for a dynamic pressure variation, depending on the surface size.

34. The system according to claim 11, wherein the frictional elements comprise a plurality of discs arranged as a clutch.

35. The system according to claim 11, wherein the frictional elements comprise a plurality of discs arranged as a brake.

36. The system according to claim 11, wherein the frictional elements comprise pairs of friction surfaces having a mutual rotation about an axis, selectively engageable by application of an axial force to selectively transmit a rotational force therebetween, a relatative slip between adjacent discs generating heat, wherein the cooling fluid is present proximate to heat-generating surfaces of the frictional elements and has a general flow pattern in a radial direction.

37. The system according to claim 11, wherein cooling fluid flows radially outward through a radial flow path.

38. The system according to claim 11, wherein cooling fluid flows radially inward through a radial flow path.

39. The system according to claim 11, further comprising a control for selectively controlling a pressure difference between the cooling fluid supply and the cooling fluid discharge, to thereby control a volume flow of cooling fluid.

40. The system according to claim 11, further comprising an electronic control for selectively activating a hydraulic piston to apply a force pressure between frictional elements to selectively transmit a rotational force therebetween, wherein a backup hydraulic mode control is provided, in an event of electronic control failure, based on a dynamic pressure of cooling fluid resulting from rotation of transmission components, to hydraulically activate the hydraulic piston.

41. A system for supplying cooling fluid to an automatic transmission for a vehicle, comprising a set of frictional elements comprising a set of outer discs mounted on a disc carrier and having a tooth structure, having a cooling fluid supply which encloses the set of frictional elements within circumferential space comprising first and second annular grooves, the first annular groove comprising a supply channel, cooling fluid within the first annular groove flowing adjacent to the set of outer discs and absorbing heat therefrom, to the second annular groove, which comprises a supply chamber, and radially inward in the direction of the set of outer discs, through the disc tooth structure, and hence into the disc carrier; and a discharge, having a pressure difference variation with respect to the cooling fluid supply which serves as a control signal to control a flow rate of cooling fluid through the set of frictional elements.

42. The system according to claim 41, further comprising a seal for containing cooling fluid bathing the frictional elements between the cooling fluid supply chamber and the cooling fluid discharge.

43. The system according to claim 42, wherein the seal extends between a support of a terminal outer disc to a housing or adjoining hydraulic actuator.

44. The system according to claim 42, wherein the automatic transmission comprises a hydraulic actuator for engaging the frictional elements, elastomeric sealing elements being provided as seals on a hydraulic actuator side and on a support side or in the tooth structure of the terminal discs, respectively.

45. A system for supplying cooling fluid to mutually rotatable frictional elements of an automatic transmission for a vehicle, comprising a cooling fluid supply and a cooling fluid discharge, having a respective pressure difference, said pressure difference controlling a flow of cooling fluid through the frictional elements, a maintenance of a defined pressure difference ensuring a defined flow of cooling fluid through the frictional elements, wherein a dynamic pressure of the cooling fluid resulting from rotation within the transmission provides a control signal for a fail-safe operating mode to selectively engage the frictional elements to transmit a rotational force therebetween.

46. A system for supplying cooling fluid to mutually rotatable frictional elements of an automatic transmission for a vehicle, comprising a cooling fluid supply and a cooling fluid discharge, having a respective pressure difference, said pressure difference controlling a flow of cooling fluid about the frictional elements, a maintenance of a defined pressure difference ensuring a defined flow of cooling fluid through the frictional elements, and an electronic control for controlling the cooling fluid flow, wherein, in case the electronic control fails, an emergency control employs a dynamic pressure of the cooling fluid as a direct control signal for an actuation of the frictional elements to control a mutual rotation thereof, such that a hydraulic control mode emergency start-up capability is ensured within the scope of an emergency program.

47. A system for cooling a clutch or brake in an automatic transmission for a vehicle with a fluid, the clutch or brake selectively transmitting a rotational force based on an axially applied pressure between respective pairs of discs, the discs generating heat as a result of slippage, comprising a cooling fluid supply and a cooling fluid discharge, the cooling fluid supply being concentric with the discs, a radial flow path for cooling fluid being defined, allowing intimate contact of fluid with portions of radial surfaces of the discs, wherein a flow rate of cooling fluid is controlled by a respective pressure difference between the cooling fluid supply and the cooling fluid discharge and an electronic control for selectively activating a hydraulic piston to apply the axially applied pressure, wherein a backup hydraulic mode control is provided, in an event of electronic control failure, based on a dynamic pressure of cooling fluid resulting from rotation of transmission components, to hydraulically activate the hydraulic piston.

48. The system according to claim 47, having a plurality of separately operable clutches or brakes, further comprising a control for selectively controlling a pressure differential between the cooling fluid supply and the cooling fluid discharge for each clutch or brake.

49. The system according to claim 48, wherein the control dynamically provides a high pressure differential for clutches or brakes subject to slippage, and a low pressure differential for clutches or brakes not subject to slippage.

50. The system according to claim 47, wherein the pairs of discs of the clutch or brake are mounted on inner disc carriers and outer disc carriers, respectively, the inner and outer disc carriers having apertures permitting cooling fluid flow in a radial direction, further comprising at least one elastomeric seal for selectively containing the cooling fluid proximate to the pairs of discs and separate from other transmission components.

51. The system according to claim 47, wherein the pairs of discs form a clutch packet, and a rotation of the discs induces a dynamic pressure of the cooling fluid, further comprising a piston for actuating the clutch packet by applying a pressure along a rotational axis, the piston having an outer piston diameter and a piston attack diameter, the outer piston diameter being designed in relation to the piston attack diameter to compensate for the effect of the dynamic pressure on the flow of cooling fluid through the clutch packet.

* * * * *